US012347239B2

(12) United States Patent
Luo et al.

(10) Patent No.: US 12,347,239 B2
(45) Date of Patent: Jul. 1, 2025

(54) FACE LIVENESS DETECTION METHOD, SYSTEM, APPARATUS, COMPUTER DEVICE, AND STORAGE MEDIUM

(71) Applicant: Tencent Technology (Shenzhen) Company Limited, Shenzhen (CN)

(72) Inventors: Zhao Luo, Shenzhen (CN); Kun Bai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 406 days.

(21) Appl. No.: 17/964,688

(22) Filed: Oct. 12, 2022

(65) Prior Publication Data

US 2023/0045306 A1 Feb. 9, 2023

Related U.S. Application Data

(63) Continuation of application No. PCT/CN2021/103424, filed on Jun. 30, 2021.

(30) Foreign Application Priority Data

Aug. 14, 2020 (CN) .......................... 20210816200.X

(51) Int. Cl.
*G06V 40/40* (2022.01)
*G06V 10/82* (2022.01)
*G06V 40/16* (2022.01)

(52) U.S. Cl.
CPC .............. *G06V 40/45* (2022.01); *G06V 10/82* (2022.01); *G06V 40/172* (2022.01)

(58) Field of Classification Search
CPC ........ G06F 21/32; G06N 20/10; G06N 20/20; G06N 3/09; G06N 5/01; G06V 10/24;

(Continued)

(56) References Cited

U.S. PATENT DOCUMENTS

2016/0335515 A1 11/2016 Juveneton et al.
2020/0175260 A1* 6/2020 Cheng .................. G06T 7/50
2020/0257914 A1* 8/2020 Wu ..................... G06V 40/169

FOREIGN PATENT DOCUMENTS

CN 108509916 A 9/2018
CN 110569808 A 12/2019

(Continued)

OTHER PUBLICATIONS

Kuang et al, "Multi-modal Multi-layer Fusion Network with Average Binary Center Loss for Face Anti-spoofing", 2019 (Year: 2019).*

(Continued)

*Primary Examiner* — Ruiping Li
(74) *Attorney, Agent, or Firm* — Morgan, Lewis & Bockius LLP

(57) ABSTRACT

A face liveness detection method is provided, and includes: receiving an image transmitted by a terminal, the image including a face of an object; performing data augmentation on the image, to obtain an extended image corresponding to the image, a number of extended images corresponding to the image being more than one; performing liveness detection on the extended images corresponding to the image, to obtain intermediate detection results of the extended images, a liveness detection model used in liveness detection being obtained by performing model training on an initial neural network model according to a sample image and extended sample images corresponding to the sample image; and obtaining a liveness detection result of the object in the image after fusing the intermediate detection results of the extended images.

18 Claims, 10 Drawing Sheets

(58) Field of Classification Search
CPC .. G06V 10/774; G06V 10/7747; G06V 10/82; G06V 40/16; G06V 40/172; G06V 40/45
See application file for complete search history.

(56) References Cited

FOREIGN PATENT DOCUMENTS

| | | |
|---|---|---|
| CN | 110705392 A | 1/2020 |
| CN | 111079576 A | 4/2020 |
| CN | 111310575 A | 6/2020 |
| CN | 111310724 A | 6/2020 |
| CN | 111340014 A | 6/2020 |
| CN | 111488872 A | 8/2020 |
| CN | 111680675 A | 9/2020 |
| WO | WO 2020159437 A1 | 8/2020 |

OTHER PUBLICATIONS

Zhang et al, "A Dataset and Benchmark for Large-scale Multi-modal Face Anti-spoofing", 2019. (Year: 2019).*
Zhang et al, "FeatherNets: Convolutional Neural Networks as Light as Feather for Face Anti-spoofing", 2019. (Year: 2019).*
Tencent Technology, ISR, PCT/CN2021/103424, Sep. 28, 2021, 2 pgs.
Tencent Technology, WO, PCT/CN2021/103424, Sep. 28, 2021, 4 pgs.
Tencent Technology, IPRP, PCT/CN2021/103424, Feb. 7, 2023, 5 pgs.
Baoliang Chen et al., "Face Anti-spoofing by Fusing High and Low Frequency Features for Advanced Generalization Capability", 2020 IEEE Conference on Multimedia Information Processing and Retrieval (MIPR), IEEE, Aug. 6, 2020, XP033814490, 6 pgs.
Huafeng Kuang et al., "Multi-modal Multi-layer Fusion Network with Average Binary Center Loss for Face Anti-spoofing", Proceedings of the 28th ACM Joint Meeting on European Software Engineering Conference and Symposium on the Foundations of Software Engineering, ACM, New York, NY, USA, Oct. 15, 2019, XP058640260, 9 pgs.
Tao Shen et al., "FaceBagNet: Bag-of-local-features Model for Multi-modal Face Anti-spoofing", 2019 IEEE/CVF Conference on Computer Vision and Pattern Recognition Workshops (CVPRW), IEEE, Jun. 16, 2019, XP033746999, 6 pgs.
Shifeng Zhang et al. "Casia-Surf: A Large-scale Multi-modal Benchmark for Face Anti-spoofing", Arxiv.Org, Cornell University Library, 201 Olin Library Cornell University Ithaca, Ny 14853, Aug. 28, 2019, XP081591681, 11 pgs.
Tencent Technology, Extended European Search Report and Supplementary Search Report, EP21855272.7, Sep. 19, 2023, 10 Pgs.
Qing Yang et al., "PipeNet: Selective Modal Pipeline of Fusion Network for Multi-Modal Face Anti-Spoofing", Arxiv.org, Cornell University Library, 201 Olin Library Cornell University Ithaca, NY 14853, Apr. 24, 2020, XP081652493, 9 pgs.
Tencent Technology, European Office Action, EP Patent Application No. 21855272.7, Aug. 1, 2024, 5 pgs.

* cited by examiner

FACE LIVENESS DETECTION METHOD, SYSTEM, APPARATUS, COMPUTER DEVICE, AND STORAGE MEDIUM

CROSS-REFERENCE TO RELATED APPLICATIONS

This application is a continuation application of PCT Patent Application No. PCT/CN2021/103424, entitled "FACE LIVENESS DETECTION METHOD, SYSTEM AND APPARATUS, COMPUTER DEVICE, AND STORAGE MEDIUM" filed on Jun. 30, 2021, which claims priority to Chinese Patent Application No. 202010816200.X, filed with the State Intellectual Property Office of the People's Republic of China on Aug. 14, 2020, and entitled "FACE LIVENESS DETECTION METHOD, SYSTEM, APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a face liveness detection method, a system, an apparatus, a computer device, and a storage medium.

BACKGROUND OF THE DISCLOSURE

With the development of computer technologies, a liveness detection technology appears in order to perform identity authentication on a user more accurately and conveniently. The liveness detection technology may use biometric information to verify whether the user is a liveness and operates by himself, which may effectively avoid common attack means such as a photo, a face swap, a mask, and an occlusion.

Currently, when identity authentication is performed on a user by using the liveness detection technology, an accurate detection result is hardly obtained through one image. In order to improve the detection accuracy, the user generally needs to upload a plurality of images for an analysis. However, the user cannot perform liveness detection until the plurality of images are uploaded successfully, and the transmission of the plurality of images costs some time, resulting in low efficiency of the liveness detection.

SUMMARY

A face liveness detection method is performed by a computer device, and the method includes:
  receiving an image transmitted by a terminal, the image being an image including a face of an object;
  performing data augmentation on the image, to obtain an extended image corresponding to the image, a number of extended images corresponding to the image being more than one;
  performing liveness detection on the extended images corresponding to the image, to obtain intermediate detection results of the extended images, a liveness detection model used in liveness detection being obtained by performing model training on an initial neural network model according to a sample image and extended sample images corresponding to the sample image; and
  obtaining a liveness detection result of the object in the image after fusing the intermediate detection results of the extended images.

A face liveness detection method is performed by a computer device, and the method includes:
  obtaining an image, the image being an image including a face of an object;
  transmitting the image to a liveness detection server, where
  the image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images, a liveness detection model used in liveness detection being obtained by performing model training on an initial neural network model according to a sample image and extended sample images corresponding to the sample image; and
  receiving the liveness detection result of the image returned by the liveness detection server.

A face liveness detection system includes a terminal and a liveness detection server, where
  the terminal is configured to obtain an image, the image being an image including a face of an object;
  the terminal is further configured to transmit the image to the liveness detection server;
  the liveness detection server is configured to receive the image, and perform data augmentation on the image, to obtain an extended image corresponding to the image, a number of extended images corresponding to the image being more than one;
  the liveness detection server is further configured to perform liveness detection on the extended images corresponding to the image, to obtain intermediate detection results of the extended images; obtain a liveness detection result of the object in the image after fusing the intermediate detection results of the extended images, a liveness detection model used in liveness detection being obtained by performing model training on an initial neural network model according to a sample image and extended sample images corresponding to the sample image; and
  the liveness detection server is further configured to return the liveness detection result to the terminal.

A face liveness detection apparatus includes:
  an obtaining module, configured to receive an image transmitted by a terminal, the image being an image including a face of an object;
  an augmentation processing module, configured to perform data augmentation on the image, to obtain an extended image corresponding to the image, a number of extended images corresponding to the image being more than one;
  a detection module, configured to perform liveness detection on the extended images corresponding to the image, to obtain intermediate detection results of the extended images, a liveness detection model used in liveness detection being obtained by performing model training on an initial neural network model according to a sample image, extended sample images corresponding to the sample image, and a real liveness category corresponding to the sample image; and a fusing module, configured to fuse the intermediate detection results of the extended images, to obtain a liveness detection result of the object in the image.

A face liveness detection apparatus includes:

an obtaining module, configured to obtain an image, the image being an image including a face of an object;

a transmission module, configured to transmit the image to a liveness detection server, where the image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images, a liveness detection model used in liveness detection being obtained by performing model training on an initial neural network model according to a sample image and extended sample images corresponding to the sample image; and a receiving module, configured to receive the liveness detection result of the image returned by the liveness detection server.

A computer device includes a memory and one or more processors, the memory storing a computer-readable instruction, the computer-readable instruction, when executed by the one or more processors, causing the one or more processors to implement the following operations:

receiving an image transmitted by a terminal, the image being an image including a face of an object;

performing data augmentation on the image, to obtain an extended image corresponding to the image, a number of extended images corresponding to the image being more than one;

performing liveness detection on the extended images corresponding to the image, to obtain intermediate detection results of the extended images, a liveness detection model used in liveness detection being obtained by performing model training on an initial neural network model according to a sample image and extended sample images corresponding to the sample image; and obtaining a liveness detection result of the object in the image after fusing the intermediate detection results of the extended images.

A computer device includes a memory and one or more processors, the memory storing a computer-readable instruction, the computer-readable instruction, when executed by the one or more processors, causing the one or more processors to implement the following steps:

obtaining an image, the image being an image including a face of an object;

transmitting the image to a liveness detection server, where the image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images, a liveness detection model used in liveness detection being obtained by performing model training on an initial neural network model according to a sample image and extended sample images corresponding to the sample image; and receiving the liveness detection result of the image returned by the liveness detection server.

One or more non-transitory computer-readable storage mediums store a computer-readable instruction, the computer-readable instruction, when executed by one or more processors, causing the one or more processors to implement the following steps:

receiving an image transmitted by a terminal, the image being an image including a face of an object;

performing data augmentation on the image, to obtain an extended image corresponding to the image, a number of extended images corresponding to the image being more than one;

performing liveness detection on the extended images corresponding to the image, to obtain intermediate detection results of the extended images, a liveness detection model used in liveness detection being obtained by performing model training on an initial neural network model according to a sample image and extended sample images corresponding to the sample image; and obtaining a liveness detection result of the object in the image after fusing the intermediate detection results of the extended images.

One or more non-transitory computer-readable storage mediums store a computer-readable instruction, the computer-readable instruction, when executed by one or more processors, causing the one or more processors to implement the following steps:

obtaining an image, the image being an image including a face of an object;

transmitting the image to a liveness detection server, where the image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images, a liveness detection model used in liveness detection being obtained by performing model training on an initial neural network model according to a sample image and extended sample images corresponding to the sample image; and receiving the liveness detection result of the image returned by the liveness detection server.

A computer program product or a computer program includes a computer-readable instruction, and the computer-readable instruction is stored in a computer-readable storage medium. A processor of a computer device reads the computer-readable instruction from the computer-readable storage medium, and the processor, when executing the computer-readable instruction, causes the computer device to perform the steps of the foregoing face liveness detection method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, this application is further elaborated in detail with reference to the accompanying drawings and embodiments. It is to be understood that the specific embodiments described herein are merely used for explaining this application but are not intended to limit this application.

A face liveness detection method provided in this application achieves liveness detection by using the computer vision technology and machine learning technology in the artificial intelligence (AI) technology.

Figure 1:
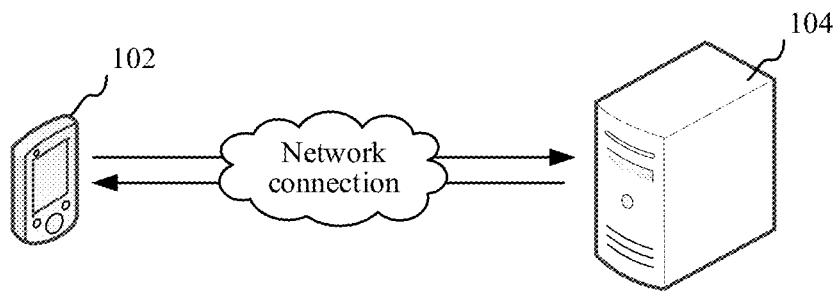
FIG. 1 is a diagram of an application environment of a face liveness detection method according to an embodiment.

The face liveness detection method provided in this application may be applied in an application environment shown in FIG. 1. A terminal 102 communicates with a liveness detection server 104 through a network. Specifically, the liveness detection server 104 may receive an image transmitted by the terminal 102; perform data augmentation on the image, to obtain an extended image corresponding to the image, a number of extended images corresponding to the image being more than one; perform liveness detection on the extended images corresponding to the image, to obtain intermediate detection results of the extended images, a liveness detection model used in liveness detection being obtained by performing model training on an initial neural network model according to a sample image and extended sample images corresponding to the sample image; and obtain a liveness detection result of an object in the image after fusing the intermediate detection results of the extended images.

The face liveness detection method provided in embodiments of this application performs, after receiving the image transmitted by the terminal, data augmentation on the image, to obtain the plurality of extended images corresponding to the image, and performs liveness detection on the obtained extended image, to obtain the intermediate detection results, so that the liveness detection result of the object in the image may be obtained according to the intermediate detection results. That is to say, the terminal only need to upload a few to-be-detected images, such as one or two to three images, so that liveness detection may be performed based on the image from the terminal. There is no need to upload a plurality of images, which avoids a time delay in transmission caused by a user waiting for the uploading of the plurality of images, thereby improving user experience. At the same time, the plurality of extended images after data augmentation are used as an object for liveness detection, which increases the amount of data, and can improve the accuracy of liveness detection to a certain degree.

In a conventional manner, liveness detection is generally performed by using a whole person as the object. The to-be-detected image includes the whole person, and liveness detection is performed by extracting biometric features of the person in the image. However, in the face liveness detection method provided in this application, the image is an image including a face of the object. By performing liveness detection on a face part, a liveness detection result for the face is obtained, to determine whether the face is a liveness. The liveness detection is performed based on the features of the face part rather than the whole person.

The terminal 102 may be, but is not limited to, a personal computer, a notebook computer, a smartphone, a tablet computer, and a portable wearable device. The liveness detection server 104 may be implemented by an independent server or a server cluster including a plurality of servers.

In a specific application scenario, when a face verification device needs to perform identity authentication on a user, a facial image of the user may be collected and be transmitted to the liveness detection server through a network. The liveness detection server performs data augmentation on the facial image, to obtain a plurality of extended images corresponding to the facial image, then performs liveness detection on the extended images respectively, and obtains the liveness detection result of the object in the image according to a plurality of detected intermediate detection results. In a case that the liveness detection server determines that the facial image uploaded by the terminal includes a real liveness, the user is determined to pass identity authentication. There is no need for the user to upload a plurality of facial images, so as to reduce a network transmission delay and decrease the waiting time of the user, thereby improving user experience. The face verification device may be a phone, a face verification machine, or other devices with an image collection apparatus.

Figure 2:
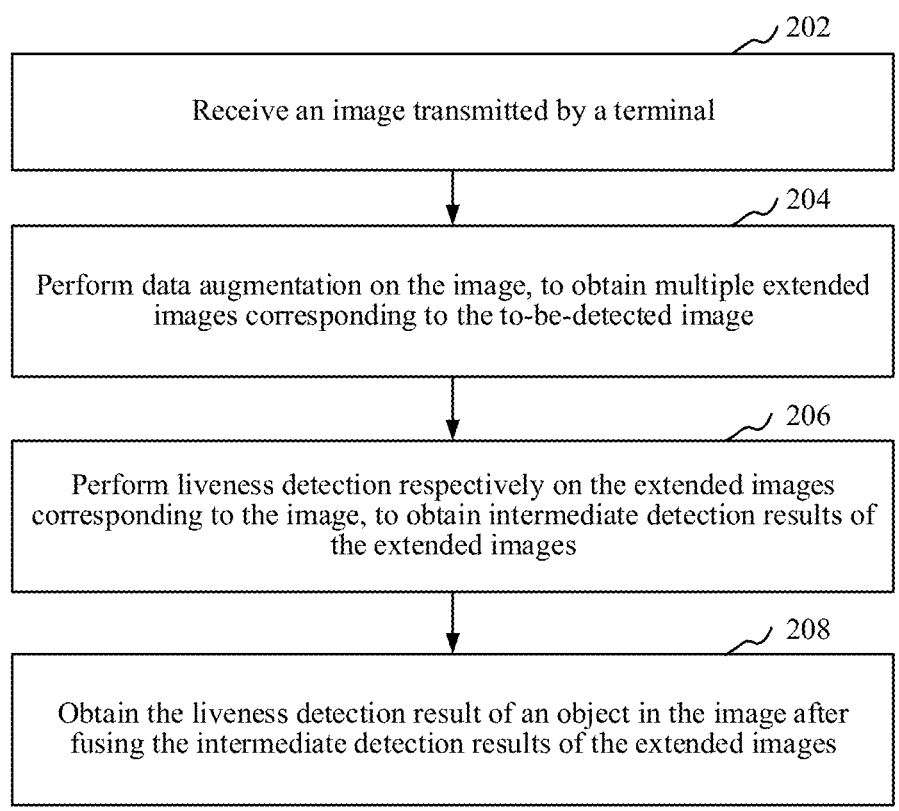
FIG. 2 is a schematic flowchart of a face liveness detection method according to an embodiment.

In an embodiment, as shown in FIG. 2, a face liveness detection method is provided. An example in which the method is applied to the liveness detection server 104 in FIG. 1 is used as an example for illustration, and the method includes the following steps:

Step 202: Receive an image transmitted by a terminal.

The to-be-detected image is an image on which liveness detection is to be performed, and includes a face of an object. The liveness detection is a method to verify whether an image includes a real liveness and whether the image is operated by a user himself according to biometric features in the image. The method is generally used for determining whether the image includes a real user, and the method is more applied in a scenario of identity authentication, which may effectively prevent an image attack. It is to be understood that the image may be a facial image, and may also be an image including a face and a gesture or an expression.

Specifically, the terminal may collect an image in real time by a local image collection apparatus, and use the collected image as the image, such as the facial image of the user collected by the terminal 102 through a camera in the FIG. 1. The to-be-detected image may also be an image exported locally by the terminal. The image is used as the image. The image exported locally may be a pre-shot photo or a stored photo, but it is to be understood that the image exported locally may not pass verification of the liveness detection generally.

In some embodiments, the terminal may also obtain a plurality of to-be-detected image, such as two or even three images, and transmit the plurality of to-be-detected images to the liveness detection server. After receiving the plurality of to-be-detected images, the liveness detection server respectively performs data augmentation to extend more images and then performs liveness detection. In order to reduce a transmission time delay generated during network transmission of the image to a greater extent and decrease' the waiting time of the user, in some other embodiments, the terminal may only obtain one to-be-detected image. After the terminal uploads the image to the liveness detection server, the liveness detection server performs subsequent data augmentation on the only to-be-detected image.

Step 204: Perform data augmentation on the image, to obtain an extended image corresponding to the image, a number of extended images corresponding to the image being more than one.

Specifically, after receiving the image transmitted by the terminal, the liveness detection server may perform data augmentation on the image, to obtain more than one extended image. The extended image is an image obtained after performing data augmentation on the original to-be-detected image, and a number of extended images corresponding to the image is more than one.

It is to be understood that, in the embodiments of this application, the number of extended images obtained after data augmentation is generally consistent with the number of used data augmentation manners. A corresponding number of extended images may be obtained by performing data augmentation on the image in several different manners.

In the field of machine learning, data augmentation is a manner used for enlarging the number of training samples. A larger number of training samples may be generated by performing data augmentation on the original training samples. For example, one sample is enlarged into two and more than two samples. A machine learning model is trained by using these new training samples, so that the obtained can has better generalization. The data augmentation in the embodiments of this application is not used for model training, but for enlarging the number of the images. A larger number of images may be obtained as extended images by performing data augmentation on the image. Different extended images carry richer image information in different special scenarios, and the information may provide support for the model to output an accurate liveness detection result.

In one embodiment, the performing data augmentation on the image includes: obtaining a first transformation parameter corresponding to a preset geometric transformation manner; and performing geometric transformation on the image according to the first transformation parameter and the preset geometric transformation manner corresponding to the first transformation parameter.

Specifically, the performing data augmentation on the image may refer to performing image transformation on the image in a geometric transformation manner. The geometric transformation manner is an image transformation manner without changing the content of the image, namely, without changing a pixel number. The preset geometric transformation manner may include at least one of image flipping, image cropping, image rotation, and image translation. The first transformation parameter is an operation parameter required to be used in geometric transformation processing, such as, a flipping direction, a size of a cropped area size, a rotation angle value, or a translation pixel value. The first transformation parameter may be random. For example, the first transformation parameter may be determined according to a random number, and may also be some preset fixed values.

In this embodiment, the liveness detection server may generate the random number firstly, determine the first transformation parameter corresponding to the preset geometric transformation manner according to the random number, and then perform data augmentation on the image according to the preset geometric transformation manner and the first transformation parameter, to obtain extended images corresponding to the preset geometric transformation manner.

In one embodiment, the performing geometric transformation on the image according to the first transformation parameter and the preset geometric transformation manner corresponding to the first transformation parameter includes at least one of the following: flipping the image along a preset direction according to a random flipping parameter; cropping the image according to a random cropping parameter; rotating the image according to a random rotation parameter; and translating the image along a preset direction according to a random translation parameter.

Figure 3:
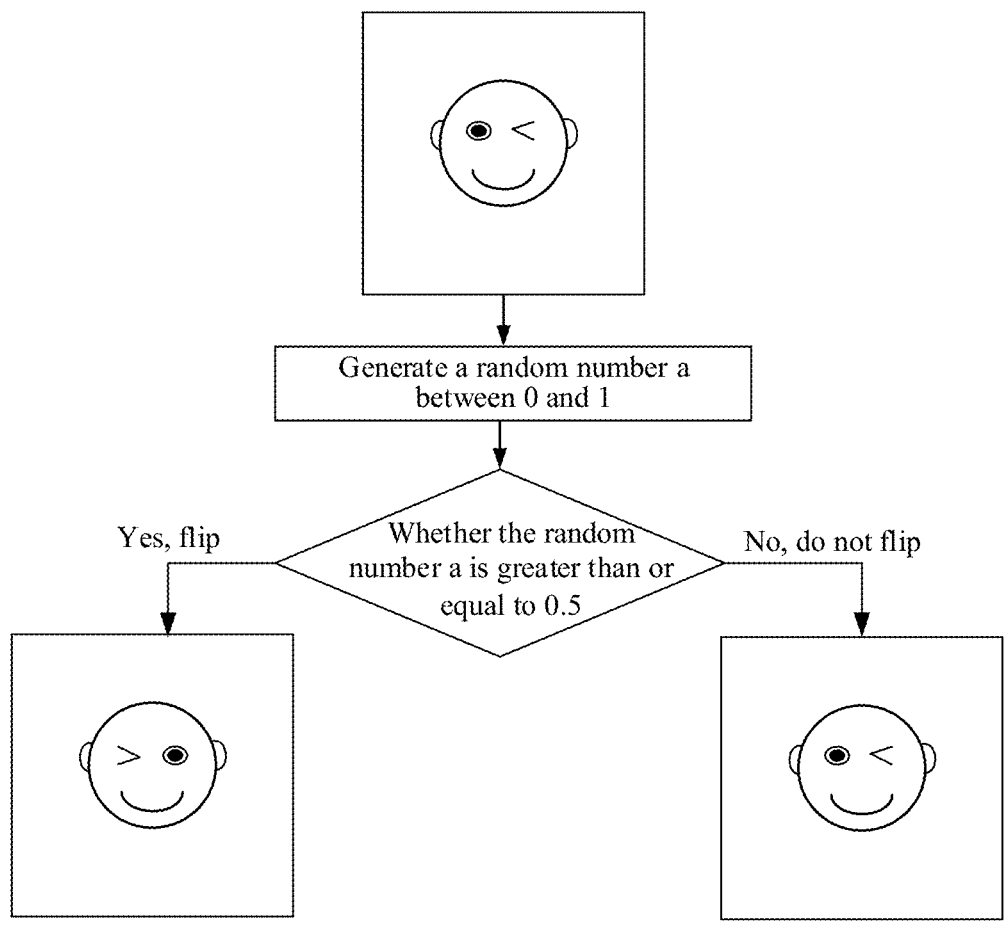
FIG. 3 is a schematic diagram of flipping an image randomly according to an embodiment.

For the flipping the image along a preset direction according to a random flipping parameter, for example, as shown in FIG. 3, the liveness detection server firstly generates a random number a between 0 and 1. In a case that the generated random number a is greater than or equal to 0.5, the image is flipped along a horizontal direction. In a case that the generated random number a is less than 0.5, the image is not flipped along the horizontal direction. In this way, the image can be flipped left and right according to a probability. Certainly, the image may be flipped along the horizontal direction or a vertical direction. In this embodiment, by randomly flipping the image, obtained extended images can provide image information of the image in a flipping scenario. After the extended images are inputted to a liveness detection model, the liveness detection model may "understand" the image from a new angle, thereby obtaining richer image information of the image, so that intermediate detection results obtained by performing liveness detection based on this are more accurate, and a final liveness detection result obtained by subsequently fusing the intermediate detection results is more reliable.

Figure 4:
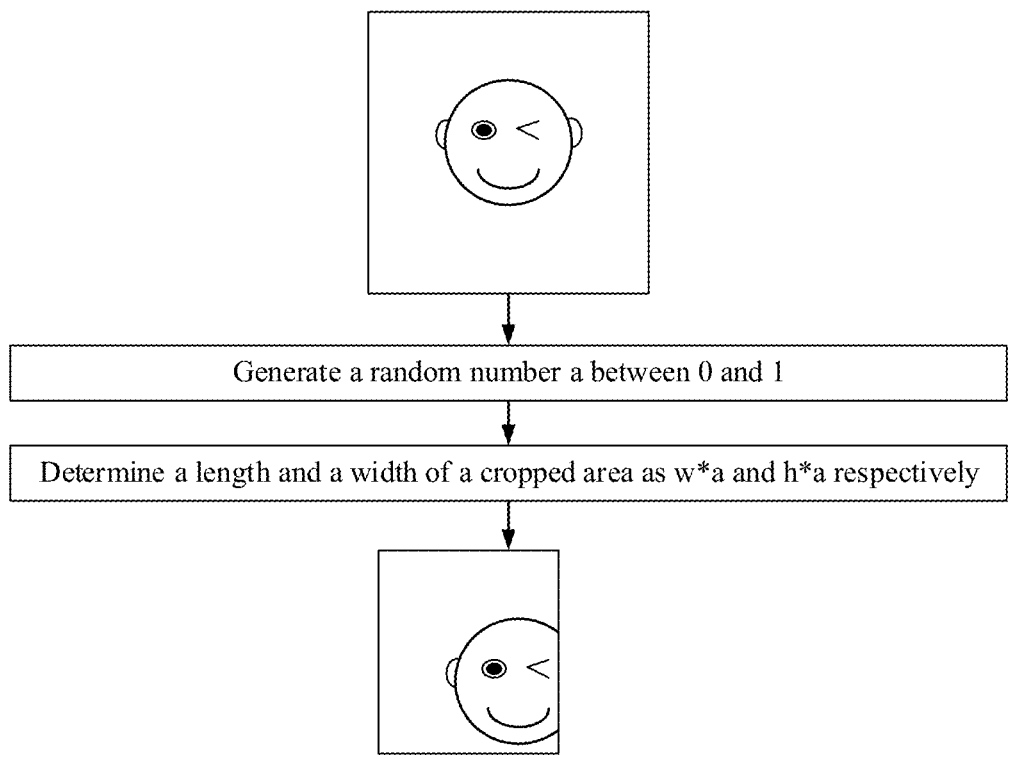
FIG. 4 is a schematic diagram of cropping an image randomly according to an embodiment.

The cropping the image according to a random cropping parameter refers to randomly cropping an area from the image as a new extended image, and a length and a width of the cropped area are determined by a random number. For example, as shown in FIG. 4, a length and a width of the original to-be-detected image are w and h respectively. For an inputted to-be-detected image, the liveness detection server firstly generates a random number a between 0 and 1, then determines a length and a width of a cropped area as w*a and h*a respectively, and may perform cropping along a long side firstly and then along a wide side. An x coordinate of a pixel of a cropping start point may be a random number between 0 and w-w*a, and a y coordinate of the pixel of the cropping start point may be a random number between 0 and h-h*a, as long as the length and width are w*a and h*a respectively. In this way, different cropped extended images may be obtained according to a probability. In this embodiment, by randomly cropping the image, obtained extended images can provide image information of the image in a cropping scenario. After the extended images are inputted to a liveness detection model, the liveness detection model may "understand" the image from another angle, namely, a cropping angle, thereby obtaining richer image information of the image, so that intermediate detection results obtained by performing liveness detection based on this are more accurate, and a final liveness detection result obtained by subsequently fusing the intermediate detection results is more reliable.

Figure 5:
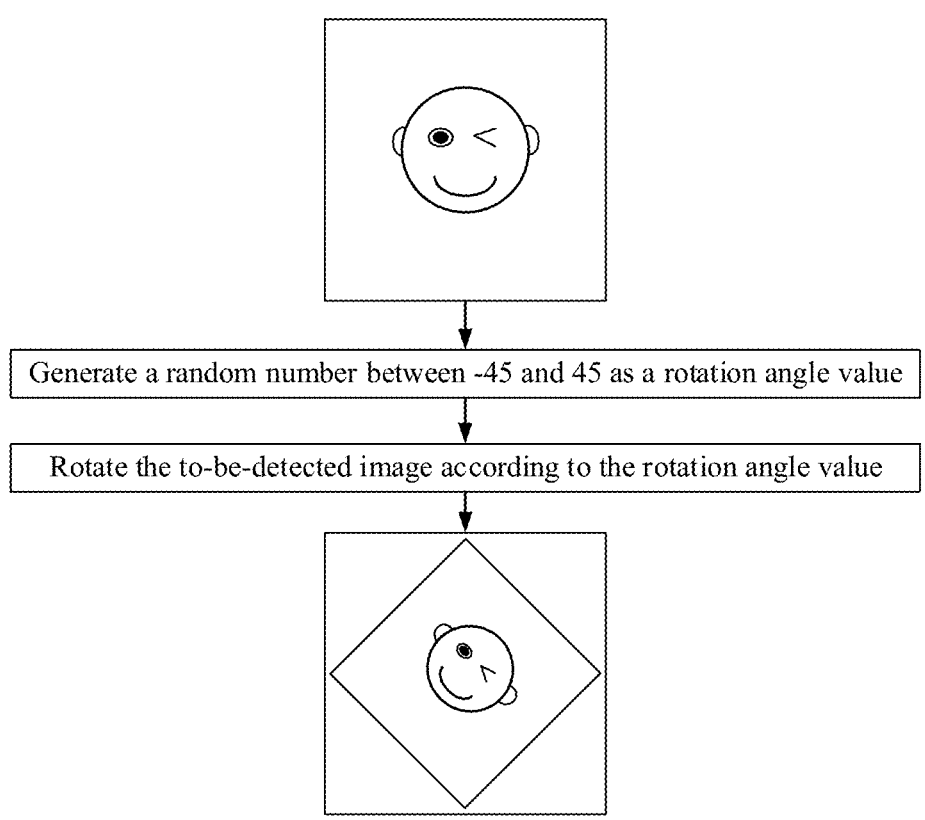
FIG. 5 is a schematic diagram of rotating an image randomly according to an embodiment.

The rotating the image according to a random rotation parameter refers to obtaining extended images after rotating the image according to a specific angle. For example, as shown in FIG. 5, the liveness detection server may generate, by using a random number generator, a random number between −45 and 45 as a rotation angle value, and then rotate the image clockwise or counterclockwise according to the rotation angle value. In this embodiment, by randomly rotating the image, obtained extended images can provide image information of the image in a rotation scenario. After the extended images are inputted to a liveness detection model, the liveness detection model may "understand" the image from a new angle, thereby obtaining richer image information of the image, so that intermediate detection results obtained by performing liveness detection based on this are more accurate, and a final liveness detection result obtained by subsequently fusing the intermediate detection results is more reliable.

Figure 6:
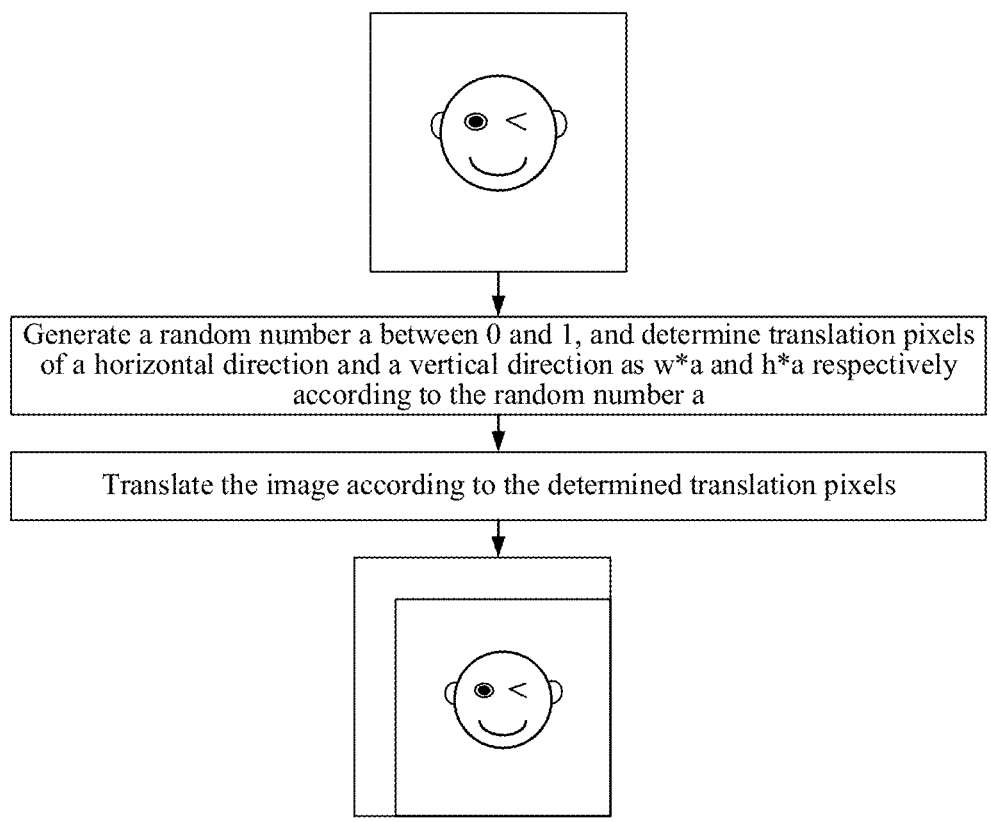
FIG. 6 is a schematic diagram of translating an image randomly according to an embodiment.

The translating the image along a preset direction according to a random translation parameter refers to obtaining extended images after translating the image along the preset direction according to a random pixel. For example, as shown in FIG. 6, a width and a length of the original to-be-detected image are w and h respectively. The liveness detection server firstly generates a random number a between 0 and 1, determines translation pixels of a horizontal direction and a vertical direction as w*a and h*a respectively according to the random number a, and then obtains corresponding extended images by translating the original to-be-detected image according to the determined translation pixels. The liveness detection server may also translate the image only along the horizontal direction or the vertical direction. In this embodiment, by randomly translating the image, obtained extended images can provide image information of the image in a translation scenario. After the extended images are inputted to a liveness detection model, the liveness detection model may "understand" the image from a new angle, thereby obtaining richer image information of the image, so that intermediate detection results obtained by performing liveness detection based on this are more accurate, and a final liveness detection result obtained by subsequently fusing the intermediate detection results is more reliable.

In one embodiment, the performing data augmentation on the image includes: obtaining a second transformation parameter corresponding to a preset image attribute adjustment manner; and performing image attribute adjustment on the image according to the second transformation parameter and the preset image attribute adjustment manner corresponding to the second transformation parameter.

Specifically, the performing data augmentation on the image may refer to performing image attribute adjustment on the image in an image attribute adjustment manner. The image attribute adjustment processing manner is an image transformation manner that needs to change the content of an image, namely, to change a pixel value. The preset image attribute adjustment manner includes at least one of image random occlusion processing, image brightness adjustment, image contrast adjustment, and grayscale processing. The second transformation parameter is an operation parameter required to be used in image attribute adjustment processing, such as, a location and a size of an occluded image area, an image brightness adjustment parameter, an image contrast adjustment parameter, or an image grayscale processing parameter. The second transformation parameter may be random. For example, the second transformation parameter may be determined according to a random number, and may also be some preset fixed values.

In this embodiment, the liveness detection server may generate the random number, determine the second transformation parameter corresponding to the preset image attribute adjustment manner according to the random number, and then perform data augmentation on the image according to the preset image attribute adjustment manner and the second transformation parameter, to obtain extended images corresponding to the preset image attribute adjustment manner.

In one embodiment, the performing image attribute adjustment on the image according to the second transformation parameter and the preset image attribute adjustment manner corresponding to the second transformation parameter includes at least one of the following: determining a random occluded area in the image according to a random number, and replacing a pixel value of each pixel in the random occluded area with a preset value; performing grayscale processing on the image, to obtain a corresponding grayscale image; adjusting brightness of the image according to a random brightness adjustment parameter; and adjusting contrast of the image according to a random contrast adjustment parameter.

Figure 7:
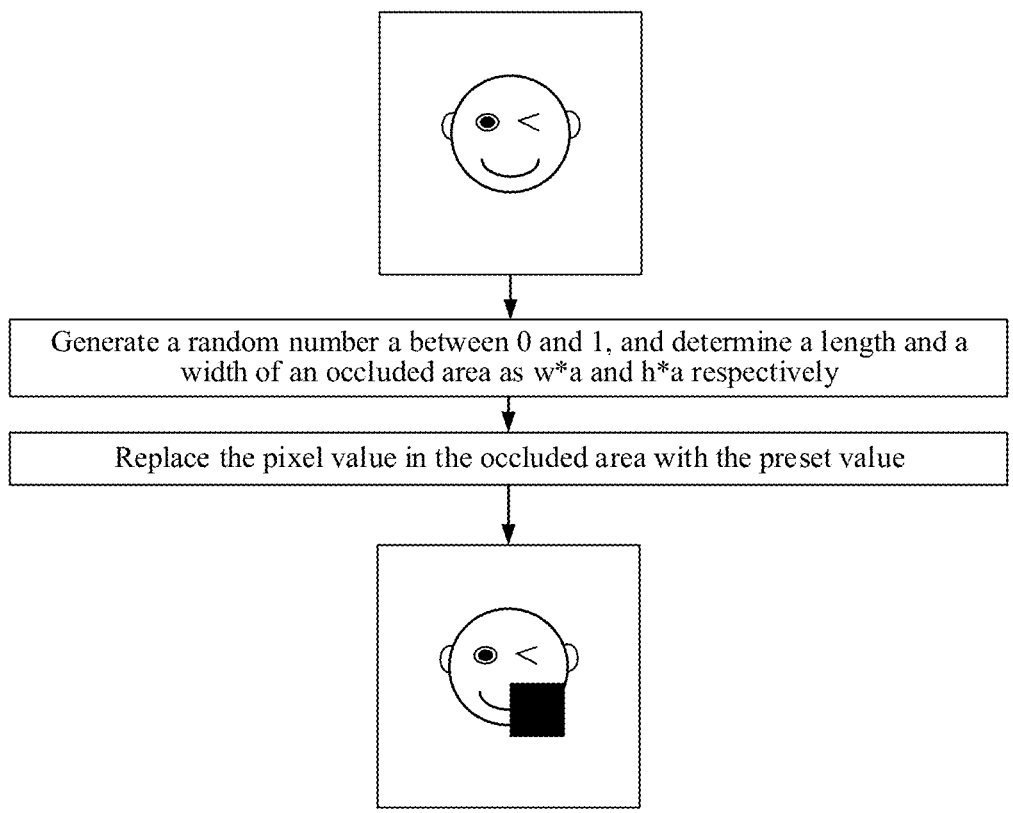
FIG. 7 is a schematic diagram of occluding an image randomly according to an embodiment.

The determining a random occluded area in the image according to a random number, and replacing a pixel value of each pixel in the random occluded area with a preset value refers to occluding a rectangular area in the original to-be-detected image, to simulate that the object in the image is occluded. As shown in FIG. 7, a length and a width of the original to-be-detected image are w and h respectively. The liveness detection server firstly generates a random number a between 0 and 1, then determines a length and a width of an occluded area as w*a and h*a respectively. An x coordinate of a pixel of a start point of the occluded area may be a random number between 0 and w-w*a, and a y coordinate of the pixel of the start point thereof may be a random number between 0 and h-h*a. In this way, the occluded area is determined, and occluded extended images may be obtained after replacing the pixel value in the occluded area with the preset value. In this embodiment, by randomly occluding the image, obtained extended images can provide image information of the image in an occluded scenario. After the extended images are inputted to a liveness detection model, the liveness detection model may "understand" the image from a new angle, thereby obtaining richer image information of the image, so that intermediate detection results obtained by performing liveness detection based on this are more accurate, and a final liveness detection result obtained by subsequently fusing the intermediate detection results is more reliable.

Figure 8:
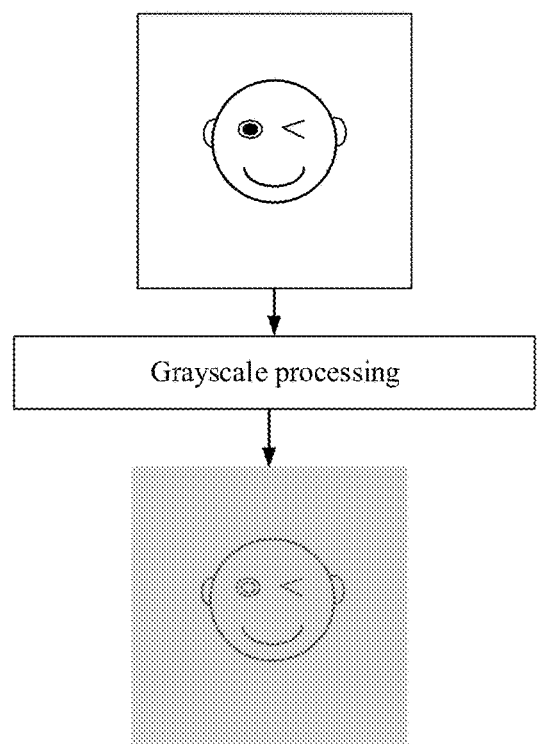
FIG. 8 is a schematic diagram of performing grayscale processing on an image according to an embodiment.

The performing grayscale processing on the image, to obtain a corresponding grayscale image refers to transforming the original to-be-detected image into a grayscale image. For example, as shown in FIG. 8, the grayscale of each pixel may be adjusted according to a grayscale formula Gray=R*0.299+G*0.587+B*0.114, so that extended images after grayscale processing can be obtained.

For example, the adjusting brightness of the image according to a random brightness adjustment parameter may refer to performing, according to the random brightness adjustment parameter, brightness adjustment on the image based on an RGB space, and adjusting RGB components of each pixel, to obtain extended images. The adjusting contrast of the image according to a random contrast adjustment parameter may also refer to performing contrast adjustment on the image based on an RGB space, to obtain extended images. Similarly, by adjusting the brightness and grayscale of the image, obtained extended images can provide image information of the image in a scenario with different lighting. After the extended images are inputted to a liveness detection model, the liveness detection model may "understand" the image in these special scenarios, thereby obtaining richer image information of the image, so that intermediate detection results obtained by performing liveness detection based on this are more accurate, and a final liveness detection result obtained by subsequently fusing the intermediate detection results is more reliable.

The liveness detection server may obtain the extended images after performing one type of data augmentation on the image, and may also obtain the extended images after performing a plurality of types of data augmentation on the image at the same time, such as, may adjust the brightness and contrast of the image at the same time.

In the foregoing embodiments, more images may be obtained by performing various types of data augmentation on the image, so that there is no need for the terminal to upload a plurality of images. Subsequently, a plurality of extended images are used as an object for liveness detection, which can improve the accuracy of liveness detection.

Step 206: Perform liveness detection respectively on the extended images corresponding to the image, to obtain intermediate detection results of the extended images.

Each intermediate detection result includes one of the extended image passing liveness detection and the extended image failing in liveness detection. For example, if the intermediate detection result is 1, it indicates that the extended image tends to express that the object in the image is a liveness; and if the intermediate detection result is 0, it indicates that the extended image tends to express that the object in the image is not a liveness. A computer device may determine, after further fusing the intermediate detection results of all extended images, whether the object in the image is a liveness.

Specifically, the liveness detection server may perform liveness detection on the extended images by using a classification method in machine learning, such as a neural network, a support vector machine, a decision tree, or a random forest.

In some embodiments, the liveness detection server may perform, by using the liveness detection model, liveness detection on the extended images corresponding to the image, to obtain the corresponding intermediate detection results. The liveness detection model may be obtained by model training in advance. The liveness detection server may obtain a training sample including a sample image, extended sample images corresponding to the sample image, and a real liveness category corresponding to the sample image; and perform the model training by using the training sample, to obtain the liveness detection model. The extended sample images corresponding to the sample image are images obtained after data augmentation is performed on the sample image, the performing data augmentation on the sample image includes performing at least one of image flipping, image cropping, image rotation, image translation, image random occlusion processing, grayscale processing, brightness adjustment, and contrast adjustment on the sample image. The real liveness category of the sample image is to be consistent with real liveness categories of the extended sample images corresponding to the sample image. Since the training sample used for training the liveness detection model includes the sample image and the corresponding extended sample images, the liveness detection model obtained by training is capable of accurately detecting the extended images. The model can deal with a facial image in various special scenarios, thereby guaranteeing that intermediate detection results obtained by predicting the extended images are reliable.

In this embodiment, the liveness detection model only includes one neural network. During training the liveness detection model, not only the sample image is used for training the one neural network, but the extended images corresponding to the sample image are also used as training samples for training the one neural network. In this way, the one neural network can learn the capability of performing liveness detection on an image in different special scenarios, so that the detection capability of the liveness detection model is stronger and more accurate.

In the related art, the method used generally is to set a plurality of neural networks when constructing the liveness detection model, and sequentially use one type of extended images to independently train one neural network of the plurality of neural networks. A plurality of independent neural networks are obtained after the training is completed, and each neural network in the plurality of neural networks only has the capability to process one specific type of extended images. In addition, when liveness detection needs to be performed on the image, augmentation processing is not performed on the image, but a plurality of intermediate detection results are obtained by processing the image by using the plurality of neural networks respectively. However, because each neural network only has one capability to process a specific type of extended images, only one of the intermediate detection results is relatively accurate, and the accuracy of other intermediate results is lower, so that the accuracy of the final detection result is also lower.

In one embodiment, when performing liveness detection on the extended images, the extended images corresponding to the image needs to be preprocessed, to be adjusted to the same input size, and then the extended images after size adjustment are inputted to the liveness detection model, to extract image features of the extended images. The image features corresponding to the extended images can reflect image information of the image from different angles. The liveness detection model obtains the intermediate detection results corresponding to the extended images by classifying based on the image feature. Therefore, all aspects of different image information are taken into account, so that the final liveness detection result is more accurate.

In some embodiments, the terminal may also extract the image features the image through an encryption network in a trained integrated encryption and detection model, and perform image reconstruction based on the image features, to obtain an encrypted image. Through encryption processing of the encryption network, there is a greater difference between the encrypted image outputted by the encryption network and the originally inputted to-be-detected image, so as to avoid the problem of leaking the personal privacy of the user when subsequently performing liveness detection on the encrypted image. After the encrypted image is obtained, the encrypted image is transmitted to the liveness detection server, and then the liveness detection server performs the foregoing data augmentation on the encrypted image, such as Gaussian blurring, image flipping, image rotation, etc. to obtain a plurality of corresponding extended images. Intermediate detection results are obtained by performing liveness detection on the extended images through a detection network in the integrated encryption and detection model. After the intermediate detection results of the extended images are fused, the liveness detection result of the object in the image is obtained. In this way, the security of the original to-be-detected image during network transmission and liveness detection analyzing and processing can be guaranteed, and the risk of leakage of personal privacy of the user can be avoided.

In one embodiment, the computer device may integrally train the encryption network and the detection network in the integrated encryption and detection model, to obtain the integrated encryption and detection model. Specifically, the computer device may obtain each training sample in a plurality of training samples, and each training sample includes a sample image and a real liveness category corresponding to the sample image. Each sample image further includes various types of extended images obtained by performing various types of data augmentation on the sample image. Through the encryption network in an initial neural network model, the image features of the sample image are extracted, image reconstruction is performed based on the image features, to obtain an encrypted image corresponding to the sample image, and a first loss is determined according to a difference between the sample image and the encrypted image. Through the detection network in the initial neural network model, liveness detection is performed on the encrypted image, to obtain a predicted liveness category corresponding to the sample image, and a second loss is determined according to a difference between a real liveness category and the predicted liveness category. The first loss is used for adjusting along a direction of enlarging the difference between the sample image and the encrypted image, and the second loss is used for adjusting along the direction of reducing the difference between the real liveness category and the predicted liveness category. In this way, the integrated encryption and detection model obtained by training can ensure the accuracy of liveness detection performed by the integrated encryption and detection model when performing encryption processing on the image. After a model parameter of the initial neural network model is adjusted according to the first loss and the second loss, the step of obtaining each training sample in a plurality of training samples is performed and training is continued, until the trained integrated encryption and detection model is obtained. The computer device used for training the integrated encryption and detection model may be a terminal or a server.

In the field of image encryption, some specific encryption algorithms (such as a hash algorithm) are generally used for encrypting an image. However, after encryption processing is performed on the image by using these algorithms, the distinguishability of the original image may be destroyed, and liveness detection cannot be directly performed on an encrypted image. For example, when the terminal encrypts the image by use these algorithms and send the encrypted image to the server, the server further needs to perform decryption processing by using a corresponding decryption method to obtain the original image, and then perform liveness detection. The original image may still be exposed during detection, which is not conducive to protecting the personal privacy of the user. However, in this embodiment, the encrypted image is obtained by encrypting the image based on the encryption network of the neural network, and there is a greater difference between the encrypted image and the original image, so that the private information of the user is eliminated, and the user information may not be directly exposed to a detection server. At the same time, the encrypted image also carries necessary identification information for liveness detection, and the liveness detection server can directly perform liveness detection on the encrypted image, to obtain the liveness detection result, so that the personal privacy of the user can be truly protected.

Step 208: Obtain the liveness detection result of the object in the image after fusing the intermediate detection results of the extended images.

Figure 9:
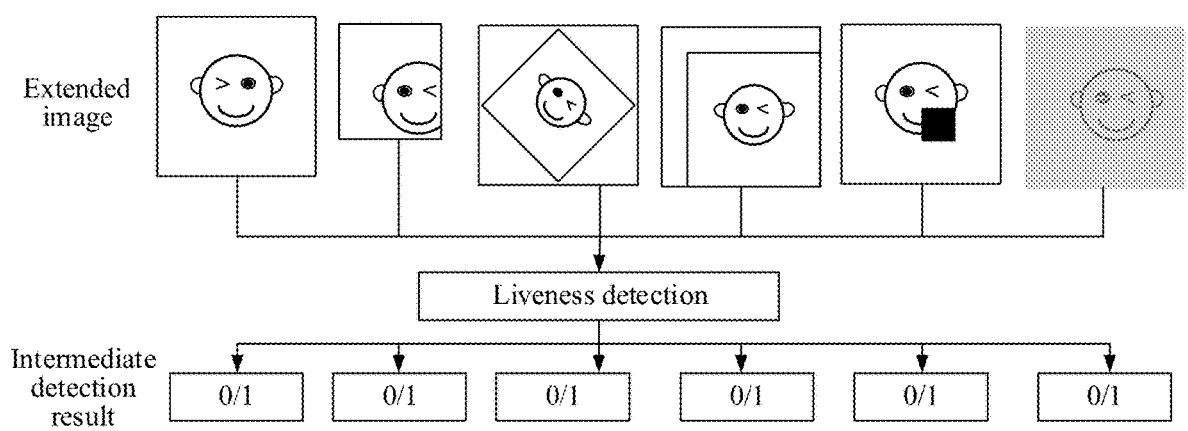
FIG. 9 is a schematic diagram of fusing detection results according to an embodiment.

Specifically, the liveness detection server may fuse the intermediate detection results corresponding to the extended images, to obtain the liveness detection result of the object in the image. For example, the final liveness detection result may be determined by using a weighted fusion method and a voting method. That is, for the intermediate detection result obtained in the foregoing step 206, ratios whose values are 0 or 1 are counted, to determine whether the object is a liveness according to the counted result, as shown in FIG. 9.

In one embodiment, step 208 includes: counting a first number of intermediate detection results indicating that the object is a liveness; counting a second number of intermediate detection results indicating that the object is not a liveness; and obtaining, when the first number is greater than the second number, the liveness detection results indicating that the object is a liveness.

In one embodiment, the liveness detection server may further return the liveness detection result to the terminal.

In some application scenarios in which identity authentication is performed on the user, when the terminal determines that the object in the image is a liveness according to the liveness detection result, the current user may be determined to pass identity verification, thereby allowing the user to perform corresponding operations, for example, perform login operations or perform payment operations by using a current user account, etc.

Figure 10:
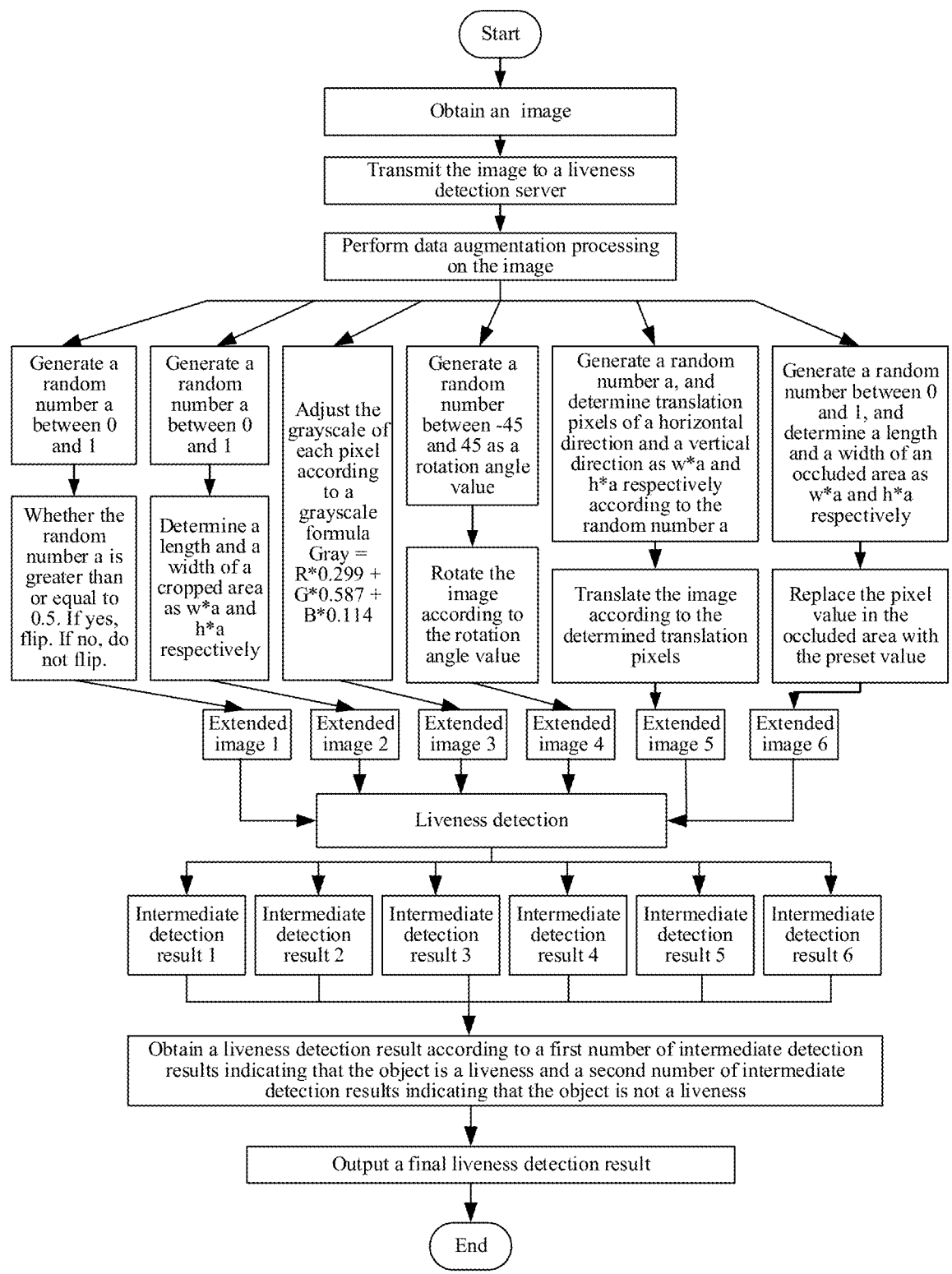
FIG. 10 is a schematic flowchart of a face liveness detection method according to a specific embodiment.

FIG. 10 is a schematic flowchart of a face liveness detection method according to a specific embodiment. Referring to FIG. 10, a terminal obtains an original to-be-detected image, and transmits the image to a liveness detection server. The liveness detection server performs data augmentation on the image, including random horizontal flipping, random cropping, grayscale processing, random rotation, random translation, and random occluding; respectively obtains a processed extended image 1 to a processed extended image 6, and then uses the extended images as the object for liveness detection, to respectively obtain an intermediate detection result 1 to an intermediate detection result 6; and finally outputs a final liveness detection result after fusing the intermediate detection results, so as to determine whether the object in the original to-be-detected image is a liveness.

In the foregoing face liveness detection method, after receiving the image transmitted by the terminal, the plurality of extended images corresponding to the image are obtained by performing data augmentation on the image, and liveness detection is performed on the extended images corresponding to the image, to obtain the intermediate detection results of the extended images so that the liveness detection result of the object in the image may be obtained according to the intermediate detection results. That is to say, the terminal only need to upload a few to-be-detected images, such as one or two to three images, so that liveness detection may be performed based on the image from the terminal. There is no need to upload a plurality of images, which avoids a time delay in transmission caused by a user waiting for the uploading of the plurality of images, thereby improving user experience. At the same time, the plurality of extended images after data augmentation are used as an object for liveness detection, which increases the amount of data, and can improve the accuracy of liveness detection to a certain degree.

It is to be understood that although each step in the flowcharts of FIG. 2 to FIG. 10 are shown in sequence according to the arrows, these steps are not necessarily executed sequentially in the sequence indicated by the arrows. Unless clearly specified in this specification, there is no strict sequence limitation on the execution of the steps, and the steps may be performed in another sequence. In addition, at least one part of the steps in FIG. 2 to FIG. 10 may include a plurality of steps or a plurality of stages. These steps or stages are not necessarily executed at the same time, but may be executed at different times. The execution sequence of these steps or stages does not have to be performed sequentially, but may be performed in turn or alternately with other steps or at least one part of the steps or stages within the other steps.

Figure 11:
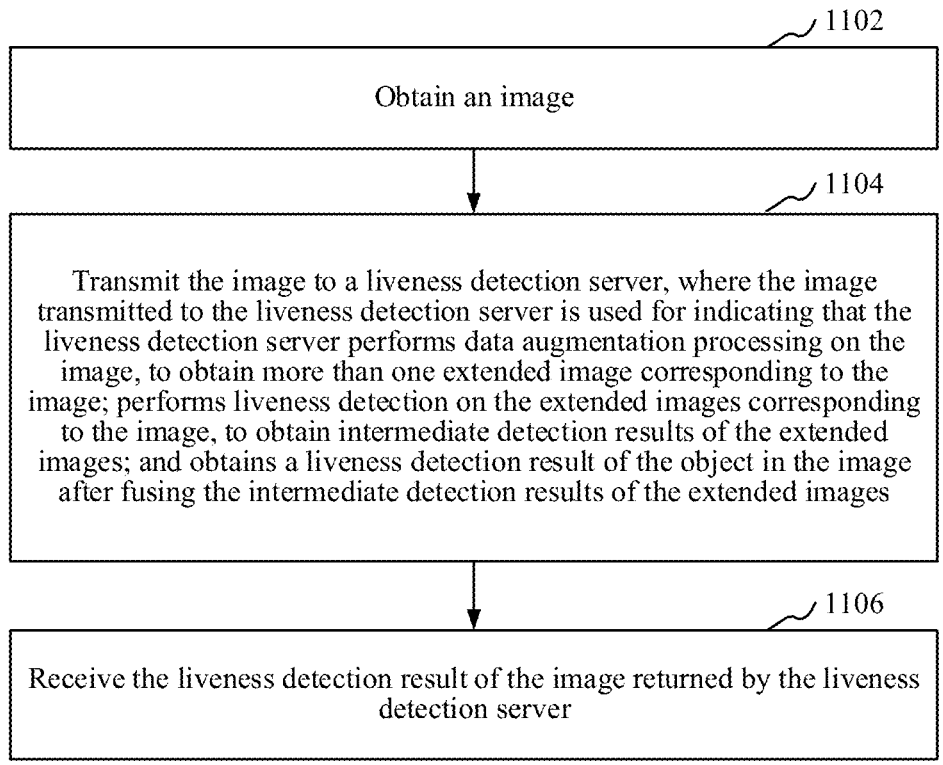
FIG. 11 is a schematic flowchart of a face liveness detection method according to another embodiment.

In one embodiment, as shown in FIG. 11, a face liveness detection method is provided. An example in which the method is applied to the terminal 102 in FIG. 1 is used as an example for illustration, and the method includes the following steps:

Step 1102: Obtain an image.

The to-be-detected image is an image on which liveness detection is to be performed. The liveness detection is a method to verify whether an image includes a real liveness and whether the image is operated by a user himself according to biometric features in the image. The method is generally used for determining whether the image includes a real user, and the method is more applied in a scenario of identity authentication, which may effectively prevent an image attack. It is to be understood that that the image may be a facial image, and may also be an image including a face and a gesture or an expression.

Specifically, the terminal may collect an image in real time by a local image collection apparatus, and use the collected image as the image, such as the facial image of the user collected by the terminal 102 through a camera in the FIG. 1. The to-be-detected image may also be an image exported locally by the terminal. The image is used as the image. The image exported locally may be a pre-shot photo or a stored photo, but it is to be understood that the image exported locally may not pass verification of the liveness detection generally.

Step 1104: Transmit the image to aliveness detection server, where the image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images.

In some embodiments, the terminal may obtain a plurality of to-be-detected image, such as two or even three images, and transmit the plurality of to-be-detected images to the liveness detection server. After receiving the plurality of to-be-detected images, the liveness detection server respectively performs data augmentation to extend more images and then performs liveness detection. In order to reduce a transmission time delay generated during network transmission of the image to a greater extent and decrease' the waiting time of the user, in some other embodiments, the terminal may only obtain one to-be-detected image. After the terminal uploads the image to the liveness detection server, the liveness detection server performs subsequent data augmentation on the only to-be-detected image.

After receiving the image transmitted by the terminal, the liveness detection server may perform data augmentation on the image, to obtain more than one extended image. The extended image is an image obtained after performing data augmentation on the original to-be-detected image, and a number of extended images corresponding to the image is more than one. A liveness detection model used in liveness detection is obtained by performing model training on an initial neural network model according to a sample image and extended sample images corresponding to the sample image.

Step 1106: Receive the liveness detection result of the image returned by the liveness detection server.

Specifically, the liveness detection server may return the liveness detection result of the object in the image to the terminal. In some application scenarios in which identity authentication is performed on the user, when the terminal determines that the object in the image is a liveness according to the liveness detection result, the current user may be determined to pass identity verification, thereby allowing the user to perform corresponding operations, for example, perform login operations or perform payment operations by using a current user account, etc.

In the foregoing face liveness detection method, after receiving the image, the terminal transmits the image to the liveness detection server, and obtains the plurality of extended images corresponding to the image by the liveness detection server performing data augmentation on the image; and performs liveness detection on the obtained extended images, to obtain the intermediate detection results of the extended images, so that the liveness detection result of the object in the image may be obtained according to the intermediate detection results, and the liveness detection result may be returned to the terminal. That is to say, the terminal only need to upload a few to-be-detected images, such as one or two to three images, so that liveness detection may be performed based on the image from the terminal. There is no need to upload a plurality of images, which avoids a time delay in transmission caused by a user waiting for the uploading of the plurality of images, thereby improving user experience. At the same time, the plurality of extended images after data augmentation are used as an object for liveness detection, which increases the amount of data, and can improve the accuracy of liveness detection to a certain degree.

In one embodiment, as shown in FIG. 1, a face liveness detection system is provided, and includes a terminal 102 and a liveness detection server 104.

The terminal 102 is configured to obtain an image, and transmit the image to the liveness detection server.

The liveness detection server 104 is configured to receive the image, and perform data augmentation on the image, to obtain an extended image corresponding to the image, a number of extended images corresponding to the image being more than one.

The liveness detection server 104 is further configured to perform liveness detection on the extended images corresponding to the image, to obtain corresponding detection results; and determine, according to the detection results corresponding to the extended images, whether the object in the image is a liveness, the liveness detection model used in liveness detection being obtained by performing model training on an initial neural network model according to a sample image and extended sample images corresponding to the sample image.

In one embodiment, the liveness detection server 104 is further configured to obtain a first transformation parameter corresponding to a preset geometric transformation manner; and perform geometric transformation on the image according to the first transformation parameter and the preset geometric transformation manner corresponding to the first transformation parameter.

In one embodiment, the preset geometric transformation manner includes at least one of image flipping, image cropping, image rotation, and image translation.

In one embodiment, the liveness detection server 104 is further configured to perform at least one of the following steps: flipping the image along a preset direction according to a random flipping parameter; cropping the image according to a random cropping parameter; rotating the image according to a random rotation parameter; and translating the image along a preset direction according to a random translation parameter.

In one embodiment, the liveness detection server 104 is further configured to obtain a second transformation parameter corresponding to a preset image attribute adjustment manner; and perform image attribute adjustment on the image according to the second transformation parameter and the preset image attribute adjustment manner corresponding to the second transformation parameter.

In one embodiment, the preset image attribute adjustment manner includes at least one of image random occlusion processing and grayscale processing.

In one embodiment, the liveness detection server 104 is further configured to perform at least one of the following steps: determining a random occluded area in the image according to a random number, and replace a pixel value of each pixel in the random occluded area with a preset value; performing grayscale processing on the image, to obtain a corresponding grayscale image; adjusting brightness of the image according to a random brightness adjustment parameter; and adjusting contrast of the image according to a random contrast adjustment parameter.

In one embodiment, the liveness detection server 104 is further configured to perform model training according to the sample image, the extended sample images corresponding to the sample image, real liveness categories respectively corresponding to the sample image, to obtain a liveness detection model; and perform, by the liveness detection model, liveness detection respectively on the extended images corresponding to the image, to obtain the corresponding detection result.

In one embodiment, the liveness detection server 104 is further configured to count a first number of detection results indicating that the object in the image is aliveness; count a second number of detection results indicating that the object in the image is not a liveness; and obtain, when the first number is greater than the second number, the liveness detection results indicating that the object in the image is a liveness.

In the foregoing face liveness detection system, after receiving the image transmitted by the terminal, the liveness detection server obtains the plurality of extended images corresponding to the image by performing data augmentation on the image, and performs liveness detection on the obtained extended images, to obtain the detection results, so that whether the object in the image is a liveness may be obtained according to the detection results. That is to say, the terminal only need to upload a few to-be-detected images, such as one or two to three images, so that liveness detection may be performed based on the image from the terminal. There is no need to upload a plurality of images, which avoids a time delay in transmission caused by a user waiting for the uploading of the plurality of images, thereby improving user experience. At the same time, the plurality of extended images after data augmentation are used as an object for liveness detection, which increases the amount of data, and can improve the detection accuracy to a certain degree.

Figure 12:
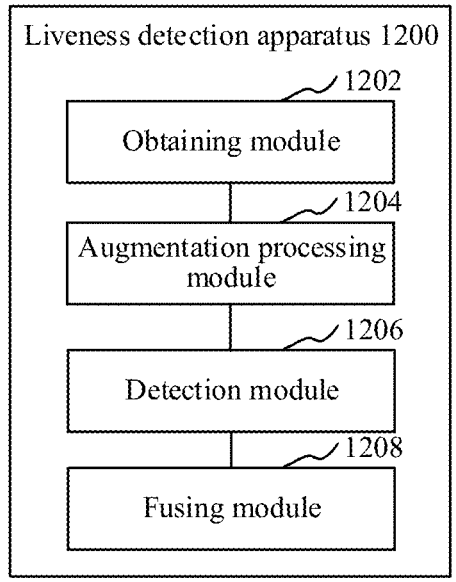
FIG. 12 is a structural block diagram of a face liveness detection apparatus according to an embodiment.

In one embodiment, as shown in FIG. 12, a face liveness detection apparatus 1200 is provided. The apparatus may use a software module or a hardware module or a combination of the two as a part of the liveness detection server. The apparatus specifically includes: an obtaining module 1202, an augmentation processing module 1204, a detection module 1206, and a fusing module 1208.

The obtaining module 1202 is configured to receive an image transmitted by a terminal.

The augmentation processing module 1204 is configured to perform data augmentation on the image, to obtain an extended image corresponding to the image, a number of extended images corresponding to the image being more than one.

The detection module 1206 is configured to perform liveness detection respectively on the extended images corresponding to the image, to obtain intermediate detection results of the extended images, a liveness detection model used in liveness detection being obtained by performing model training on an initial neural network model according to a sample image and extended sample images corresponding to the sample image.

The fusing module 1208 is configured to determine, according to the intermediate detection results corresponding to the extended images, whether the object in the image is a liveness.

In one embodiment, the augmentation processing module 1204 includes:

a parameter obtaining unit, configured to obtain a first transformation parameter corresponding to a preset geometric transformation manner; and a geometric transformation unit, configured to perform geometric transformation on the image according to the first transformation parameter and the preset geometric transformation manner corresponding to the first transformation parameter.

In one embodiment, the preset geometric transformation manner includes at least one of image flipping, image cropping, image rotation, and image translation.

In one embodiment, the geometric transformation unit is further configured to flip the image along a preset direction according to a random flipping parameter; and/or crop the image according to a random cropping parameter; and/or rotate the image according to a random rotation parameter;

and/or translate the image along a preset direction according to a random translation parameter.

In one embodiment, the augmentation processing module 1204 includes:
  a parameter obtaining unit, configured to obtain a second transformation parameter corresponding to a preset image attribute adjustment manner; and
  an image attribute adjustment unit, configured to perform image attribute adjustment on the image according to the second transformation parameter and the preset image attribute adjustment manner corresponding to the second transformation parameter.

In one embodiment, the preset image attribute adjustment manner includes at least one of image random occlusion processing and grayscale processing.

In one embodiment, the image attribute adjustment unit is further configured to determine a random occluded area in the image according to a random number, and replace a pixel value of each pixel in the random occluded area with a preset value; and/or perform grayscale processing on the image, to obtain a corresponding grayscale image; and/or adjust brightness of the image according to a random brightness adjustment parameter; and/or adjust contrast of the image according to a random contrast adjustment parameter.

In one embodiment, the detection module 1206 is further configured to perform model training according to the sample image, the extended sample images corresponding to the sample image, real liveness categories respectively corresponding to the sample image, to obtain a liveness detection model; and perform, by the liveness detection model, liveness detection respectively on the extended images corresponding to the image, to obtain the corresponding detection result.

In one embodiment, the fusing module 1208 is further configured to count a first number of detection results indicating that the object in the image is a liveness; count a second number of detection results indicating that the object in the image is not a liveness; and obtain, when the first number is greater than the second number, the liveness detection results indicating that the object in the image is a liveness.

Figure 13:
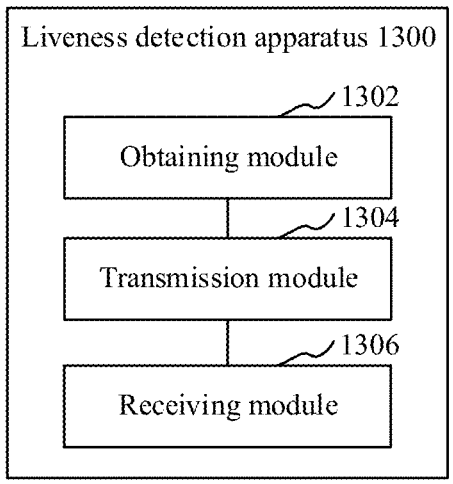
FIG. 13 is a structural block diagram of a face liveness detection apparatus according to another embodiment.

In one embodiment, as shown in FIG. 13, a face liveness detection apparatus 1300 is provided. The apparatus may use a software module or a hardware module or a combination of the two as a part of the terminal. The apparatus specifically includes: an obtaining module 1302, a transmission module 1304, and a receiving module 1306.

The obtaining module 1302 is configured to obtain an image.

The transmission module 1304 is configured to transmit the image to a liveness detection server.

The to-be-detected image transmitted to the liveness detection server is used for indicating that the liveness detection server performs data augmentation on the image, to obtain more than one extended image corresponding to the image; performs liveness detection on the extended images corresponding to the image, to obtain intermediate detection results of the extended images; and obtains a liveness detection result of the object in the image after fusing the intermediate detection results of the extended images, a liveness detection model used in liveness detection being obtained by performing model training on an initial neural network model according to a sample image and extended sample images corresponding to the sample image.

The receiving module 1306 is configured to receive the liveness detection result of the image returned by the liveness detection server.

The foregoing face liveness detection apparatus obtains, after receiving the image transmitted by the terminal, the plurality of extended images corresponding to the image by performing data augmentation on the image, and performs liveness detection on obtained extended images, to obtain the detection results, so that whether the object in the image is a liveness may be obtained according to the detection results. That is to say, the terminal only need to upload a few to-be-detected images, such as one or two to three images, so that liveness detection may be performed based on the image from the terminal. There is no need to upload a plurality of images, which avoids a time delay in transmission caused by a user waiting for the uploading of the plurality of images, thereby improving user experience. At the same time, the plurality of extended images after data augmentation are used as an object for liveness detection, which increases the amount of data, and can improve the detection accuracy to a certain degree.

For the specific limitation on the face liveness detection apparatus 1200 and the face liveness detection apparatus 1300, reference may be made to the foregoing limitation on the liveness detection method, and details are not described herein again. Each module of the foregoing face liveness detection apparatus may be wholly or partially implemented through a software, a hardware or a combination of the two. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a liveness detection server, and an internal structural diagram thereof may be shown in FIG. 14. The computer device includes a processor, a memory, and a network interface that are connected by using a system bus. The processor of the computer device is configured to provide computing and control capabilities. The memory of the computer device includes a non-transitory storage medium and an internal memory. The non-transitory storage medium stores an operating system and a computer-readable instruction. The internal memory provides an environment for running of the operating system and the computer-readable instruction in the non-transitory storage medium. The network interface of the computer device is configured to be connected with and communicate with other computer devices outside through a network. The computer-readable instruction, when executed by the processor, implements a face liveness detection method.

In an embodiment, a computer device is provided. The computer device may be a terminal, and an internal structural diagram thereof may be shown in FIG. 15. The computer device includes a processor, a memory, and a communication interface, a display screen and an image collection apparatus that are connected by using a system bus. The processor of the computer device is configured to provide computing and control capabilities. The memory of the computer device includes a non-transitory storage medium and an internal memory. The non-transitory storage medium stores an operating system and a computer-readable instruction. The internal memory provides an environment for running of the operating system and the computer-readable instruction in the non-transitory storage medium. The communications interface of the computer device is configured to communicate with an external terminal in a wired or wireless manner. The wireless communication may be implemented by WIFI, an operator network, near field communication (NFC), or other technologies. The computer-readable instruction implements a face liveness detection method when executed by the processor. The display screen of the computer device may be a liquid crystal display screen or an electronic ink display screen. An input device of the computer device may be a touch layer covered on the display screen, or a button, a trackball or a touchpad set on the shell of the computer device, and may also be an external keyboard, a touchpad, a mouse, or the like. The image collection apparatus of the computer device may be a camera or the like.

Figure 14:
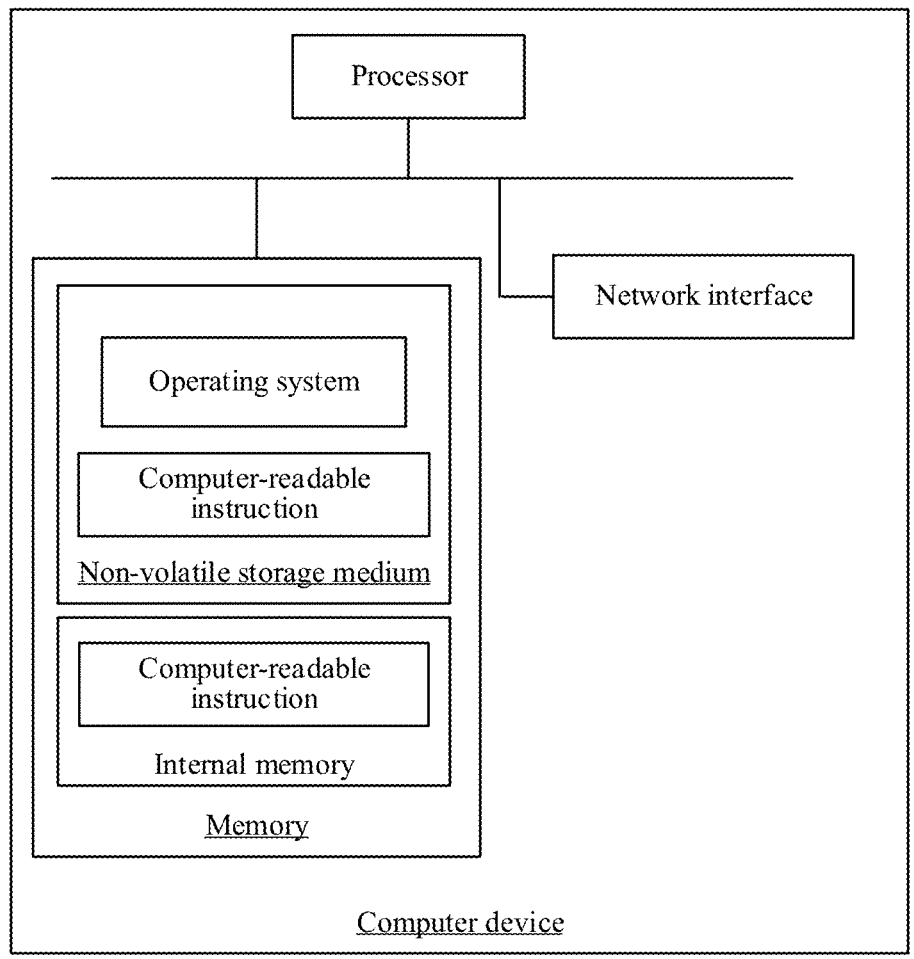
FIG. 14 is a diagram of an internal structure of a face liveness detection server according to an embodiment.
Figure 15:
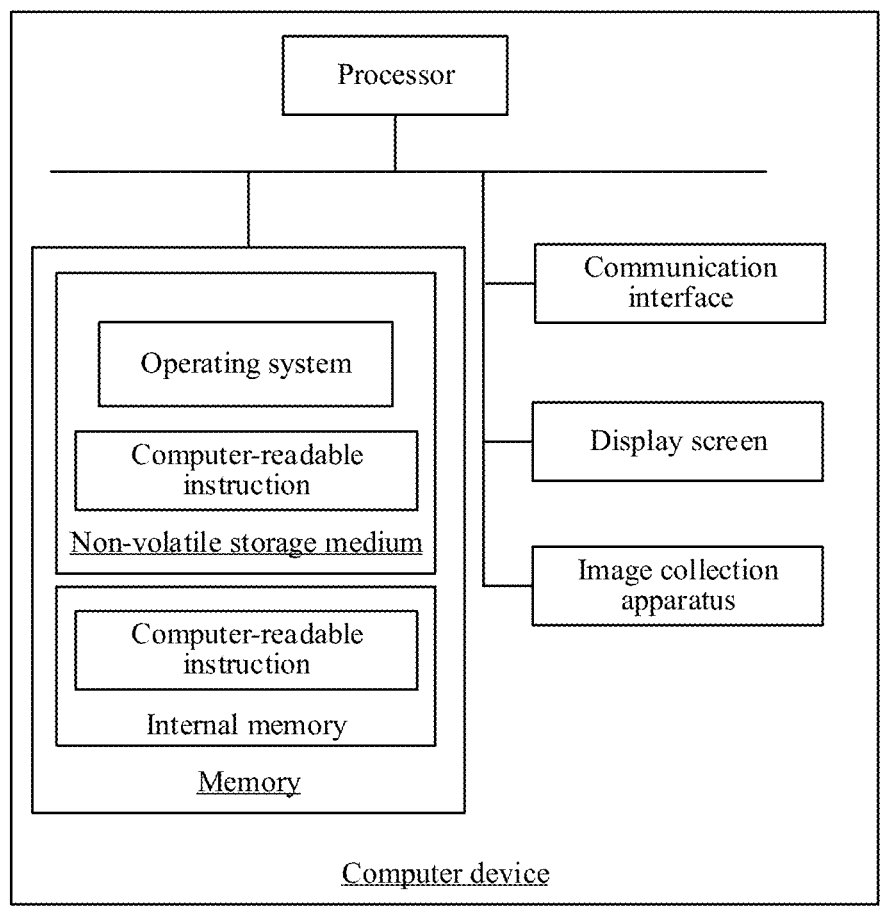
FIG. 15 is a diagram of an internal structure of a terminal in an embodiment.

A person of ordinary skill in the art may understand that the structures shown in FIG. 14 and FIG. 15 are merely block diagrams of parts of the structures related to this application and do not form a limitation to the computer device to which this application applied. Specific computer device may include more or less components than what shown in figures, or may combine some components, or may have different component arrangement.

In one embodiment, a computer device is further provided, including a memory and a processor, the memory storing a computer-readable instruction, the computer-readable instruction, when executed by the processor, causing the processor to implement the steps in the foregoing method embodiments.

In one embodiment, a computer-readable storage medium is provided, storing a computer-readable instruction, the computer-readable instruction, when executed by a processor, implementing the steps in the foregoing method embodiments.

In an embodiment, a computer program product or a computer program is provided. The computer program product or the computer program includes a computer instruction. The computer instruction is stored in a computer-readable storage medium. The processor of the computer device reads the computer instruction from the computer-readable storage medium. The processor executes the computer instruction to cause the computer device to perform the steps of the foregoing method embodiments.

A person of ordinary skill in the art may understand that all or some of the processes of the methods in the foregoing embodiments may be implemented by a computer-readable instruction instructing relevant hardware. The computer-readable instruction may be stored in a non-transitory computer-readable storage medium. The computer-readable instruction, when running, may include the procedures of the foregoing method embodiments. Any reference to a memory, a storage, a database, or another medium used in the embodiments provided in this application may include at least one of a non-transitory memory and a volatile memory. The non-transitory memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the above embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments merely describe several implementations of this application. The description goes to details, but is in no way to be thereby understood as a limitation on the patent scope hereof. A person of ordinary skill in the art may further make variations and improvements without departing from the concept of this application, and these shall all fall within the protection scope of this application. Therefore, the protection scope of this application shall be subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A face liveness detection method performed by a computer device, the method comprising:
    receiving an image from a terminal, the image comprising a face of an object captured by a camera of the terminal;
    performing data augmentation on the image, to obtain a plurality of extended images corresponding to the image, wherein each extended image is a variation of the image;
    performing liveness detection on the plurality of extended images independently, to obtain a plurality of intermediate detection results of the plurality of the extended images, wherein each intermediate detection result is obtained from the liveness detection on a corresponding extended image, a liveness detection model used in liveness detection being obtained by performing model training on an initial neural network model according to a sample image and extended sample images corresponding to the sample image;
    counting a first number of intermediate detection results indicating that the object is a liveness;
    counting a second number of intermediate detection results indicating that the object is not a liveness;
    obtaining, when the first number is greater than the second number, a final liveness detection result indicating that the object is a liveness; and
    performing a predefined operation in accordance with an identity of the object and the final liveness detection result.

2. The method according to claim 1, wherein the performing data augmentation on the image comprises:
    obtaining a first transformation parameter corresponding to a preset geometric transformation manner; and
    performing geometric transformation on the image according to the first transformation parameter and the preset geometric transformation manner corresponding to the first transformation parameter.

3. The method according to claim 2, wherein the preset geometric transformation manner comprises at least one of image flipping, image cropping, image rotation, and image translation.

4. The method according to claim 2, wherein the performing geometric transformation on the image according to the first transformation parameter and the preset geometric transformation manner corresponding to the first transformation parameter comprises at least one of the following:
  flipping the image along a preset direction according to a random flipping parameter;
  cropping the image according to a random cropping parameter;
  rotating the image according to a random rotation parameter; and
  translating the image along a preset direction according to a random translation parameter.

5. The method according to claim 1, wherein the performing data augmentation on the image comprises:
  obtaining a second transformation parameter corresponding to a preset image attribute adjustment manner; and
  performing image attribute adjustment on the image according to the second transformation parameter and the preset image attribute adjustment manner corresponding to the second transformation parameter.

6. The method according to claim 5, wherein the preset image attribute adjustment manner comprises at least one of image random occlusion processing, grayscale processing, image brightness adjustment, and image contrast adjustment.

7. The method according to claim 5, wherein the performing image attribute adjustment on the image according to the second transformation parameter and the preset image attribute adjustment manner corresponding to the second transformation parameter comprises at least one of the following:
  determining a random occluded area in the image according to a random number, and replacing a pixel value of each pixel in the random occluded area with a preset value;
  performing grayscale processing on the image, to obtain a corresponding grayscale image;
  adjusting brightness of the image according to a random brightness adjustment parameter; and
  adjusting contrast of the image according to a random contrast adjustment parameter.

8. The method according to claim 1, wherein the performing liveness detection on the plurality of extended images, to obtain a plurality of intermediate detection results of the plurality of the extended images comprises:
  performing model training on the initial neural network model according to the sample image, the extended sample images corresponding to the sample image, and real liveness categories respectively corresponding to the sample image and the extended sample images, to obtain the liveness detection model; and
  performing, by the liveness detection model, liveness detection respectively on the plurality of extended images corresponding to the image, to obtain the plurality of intermediate detection results of the plurality of extended images.

9. A computer device, comprising a memory and one or more processors, the memory storing a plurality of computer-readable instructions that, when executed by the one or more processors, cause the one or more processors to implement a face liveness detection method including:
  receiving an image from a terminal, the image comprising a face of an object captured by a camera of the terminal;
  performing data augmentation on the image, to obtain a plurality of extended images corresponding to the image, wherein each extended image is a variation of the image;
  performing liveness detection on the plurality of extended images independently, to obtain a plurality of intermediate detection results of the plurality of the extended images, wherein each intermediate detection result is obtained from the liveness detection on a corresponding extended image, a liveness detection model used in liveness detection being obtained by performing model training on an initial neural network model according to a sample image and extended sample images corresponding to the sample image;
  counting a first number of intermediate detection results indicating that the object is a liveness;
  counting a second number of intermediate detection results indicating that the object is not a liveness;
  obtaining, when the first number is greater than the second number, a final liveness detection result indicating that the object is a liveness; and
  performing a predefined operation in accordance with an identity of the object and the final liveness detection result.

10. The computer device according to claim 9, wherein the performing data augmentation on the image comprises:
  obtaining a first transformation parameter corresponding to a preset geometric transformation manner; and
  performing geometric transformation on the image according to the first transformation parameter and the preset geometric transformation manner corresponding to the first transformation parameter.

11. The computer device according to claim 10, wherein the preset geometric transformation manner comprises at least one of image flipping, image cropping, image rotation, and image translation.

12. The computer device according to claim 10, wherein the performing geometric transformation on the image according to the first transformation parameter and the preset geometric transformation manner corresponding to the first transformation parameter comprises at least one of the following:
  flipping the image along a preset direction according to a random flipping parameter;
  cropping the image according to a random cropping parameter;
  rotating the image according to a random rotation parameter; and
  translating the image along a preset direction according to a random translation parameter.

13. The computer device according to claim 9, wherein the performing data augmentation on the image comprises:
  obtaining a second transformation parameter corresponding to a preset image attribute adjustment manner; and
  performing image attribute adjustment on the image according to the second transformation parameter and the preset image attribute adjustment manner corresponding to the second transformation parameter.

14. The computer device according to claim 13, wherein the preset image attribute adjustment manner comprises at least one of image random occlusion processing, grayscale processing, image brightness adjustment, and image contrast adjustment.

15. The computer device according to claim 13, wherein the performing image attribute adjustment on the image according to the second transformation parameter and the preset image attribute adjustment manner corresponding to the second transformation parameter comprises at least one of the following:
  determining a random occluded area in the image according to a random number, and replacing a pixel value of each pixel in the random occluded area with a preset value;

performing grayscale processing on the image, to obtain a corresponding grayscale image;

adjusting brightness of the image according to a random brightness adjustment parameter; and adjusting contrast of the image according to a random contrast adjustment parameter.

16. The computer device according to claim 9, wherein the performing liveness detection on the plurality of extended images, to obtain a plurality of intermediate detection results of the plurality of the extended images comprises:

performing model training on the initial neural network model according to the sample image, the extended sample images corresponding to the sample image, and real liveness categories respectively corresponding to the sample image and the extended sample images, to obtain the liveness detection model; and performing, by the liveness detection model, liveness detection respectively on the plurality of extended images corresponding to the image, to obtain the plurality of intermediate detection results of the plurality of extended images.

17. One or more non-transitory computer-readable storage mediums, storing a plurality of computer-readable instructions that, when executed by one or more processors of a computer device, causes the one or more processors to implement a face liveness detection method including:

receiving an image from a terminal, the image comprising a face of an object captured by a camera of the terminal;

performing data augmentation on the image, to obtain a plurality of extended images corresponding to the image, wherein each extended image is a variation of the image;

performing liveness detection on the plurality of extended images independently, to obtain a plurality of intermediate detection results of the plurality of the extended images, wherein each intermediate detection result is obtained from the liveness detection on a corresponding extended image, a liveness detection model used in liveness detection being obtained by performing model training on an initial neural network model according to a sample image and extended sample images corresponding to the sample image;

counting a first number of intermediate detection results indicating that the object is a liveness;

counting a second number of intermediate detection results indicating that the object is not a liveness;

obtaining, when the first number is greater than the second number, a final liveness detection result indicating that the object is a liveness; and performing a predefined operation in accordance with an identity of the object and the final liveness detection result.

18. The non-transitory computer-readable storage mediums according to claim 17, wherein the performing liveness detection on the extended images corresponding to the image, to obtain intermediate detection results of the extended images comprises:

performing model training on the initial neural network model according to the sample image, the extended sample images corresponding to the sample image, and real liveness categories respectively corresponding to the sample image and the extended sample images, to obtain the liveness detection model; and performing, by the liveness detection model, liveness detection respectively on the extended images corresponding to the image, to obtain the intermediate detection results of the extended images.

* * * * *